United States Patent [19]
Carpenter et al.

[11] Patent Number: 6,065,047
[45] Date of Patent: *May 16, 2000

[54] SYSTEM FOR PROVIDING SUBSCRIBER WITH ACCESS TO A CONTENT AREA CUSTOMIZED FOR THE COMBINATION OF SUBSCRIBER'S RESPONSES TO TOPIC PROMPT, SUBTOPIC PROMPT, AND ACTION PROMPT

[75] Inventors: Kevin D. Carpenter, Columbus; Alexander D. Crosett, III, Dublin; Scott L. Kauffman, Columbus; Robert B. Vance, Jr., Columbus; Susan D. Wylie, Columbus; Gary A. Yeauger, Dublin, all of Ohio

[73] Assignee: America Online, Inc., Dulles, Va.

[*] Notice: This patent issued on a continued prosecution application filed under 37 CFR 1.53(d), and is subject to the twenty year patent term provisions of 35 U.S.C. 154(a)(2).

[21] Appl. No.: 08/590,929

[22] Filed: Jan. 24, 1996

[51] Int. Cl.[7] .................................................. G06F 17/30
[52] U.S. Cl. ........................... 709/218; 709/203; 709/219
[58] Field of Search .......................... 707/102, 4; 710/62, 710/64; 348/6; 709/219, 250, 217, 218, 203; 345/326; 455/4.2

[56] References Cited

U.S. PATENT DOCUMENTS

| | | | |
|---|---|---|---|
| 4,754,326 | 6/1988 | Kram et al. | 364/900 |
| 5,146,591 | 9/1992 | Bachman et al. | 395/600 |
| 5,175,814 | 12/1992 | Anick et al. | 395/161 |
| 5,241,645 | 8/1993 | Cimral et al. | 395/500 |
| 5,249,300 | 9/1993 | Bachman et al. | 395/800 |
| 5,297,253 | 3/1994 | Meisel | 395/160 |
| 5,317,568 | 5/1994 | Bixby et al. | 370/85.6 |
| 5,371,532 | 12/1994 | Gelman et al. | 348/7 |
| 5,414,812 | 5/1995 | Filip et al. | 395/200 |
| 5,414,838 | 5/1995 | Kolton et al. | 395/600 |
| 5,436,637 | 7/1995 | Gayraud et al. | 345/116 |
| 5,479,601 | 12/1995 | Matheny et al. | 345/326 |
| 5,544,354 | 8/1996 | May et al. | 707/4 |
| 5,551,055 | 8/1996 | Matheny et al. | 710/62 |
| 5,553,218 | 9/1996 | Li et al. | 707/102 |
| 5,553,311 | 9/1996 | McLaughlin et al. | 710/64 |
| 5,581,479 | 12/1996 | McLaughlin et al. | 348/6 |
| 5,604,682 | 2/1997 | McLaughlin et al. | 709/219 |
| 5,636,139 | 6/1997 | McLaughlin et al. | 709/219 |
| 5,694,549 | 12/1997 | Carlin et al. | 709/250 |
| 5,754,939 | 5/1998 | Herz et al. | 455/4.2 |
| 5,799,157 | 8/1998 | Escallon | 709/217 |

*Primary Examiner*—Hoa T. Nguyen
*Assistant Examiner*—David Ton
*Attorney, Agent, or Firm*—Standley & Gilcrest LLP

[57] ABSTRACT

A system for navigating an online information system is disclosed. Subscribers provide topic and action preferences to traverse to a customized content area in which related tasks may be completed. Customized content areas are reached after subscribers make three or fewer selections. Paths to customized content areas are similar for all combinations of topics and actions so subscribers learn quickly how to navigate to any area of the information service.

33 Claims, 9 Drawing Sheets

SYSTEM FOR PROVIDING SUBSCRIBER WITH ACCESS TO A CONTENT AREA CUSTOMIZED FOR THE COMBINATION OF SUBSCRIBER'S RESPONSES TO TOPIC PROMPT, SUBTOPIC PROMPT, AND ACTION PROMPT

BACKGROUND AND SUMMARY OF THE INVENTION

The present invention relates generally to computer navigation. Particularly, the present invention in its preferred embodiment relates to a navigation system for a computer information service.

Online information services today offer a variety of services to their subscribers. For example, subscribers of the CompuServe® Information Service may retrieve information from a repository maintained by the service or possibly, by a third party provider. In addition, CompuServe subscribers may communicate with other subscribers. Communications may occur in real time as subscribers initiate and join ongoing "chat" sessions managed by the information service. CompuServe subscribers may also communicate directly with one another as well as with non-members via electronic mail (email.) Special interest forums within CompuServe also provide opportunities for subscribers to communicate with one another. Internet and World Wide Web access provides CompuServe subscribers with additional information sources to search and another community of computer users with which to communicate. Finally, CompuServe subscribers may perform specialized tasks such as shopping and banking online. In many instances, to perform these tasks, subscribers communicate with a computer system designed and maintained by a third party provider. For subscribers, CompuServe is a conduit for completing these tasks.

In order to attract and keep new subscribers, online information services have attempted to increase the amount of available information, expand communication facilities, and provide additional support for performing specialized tasks online. Increasingly, computer information services are becoming dependent upon third party providers to help them expand and grow because the costs of developing and providing specialized services internally may be too great. Many third party providers, however, are reluctant to make their products and services available through only one computer information service. The third party information and service providers (for example, merchants who offer their products online) would like potential customers to have a number of choices that facilitate access to their online offerings. Consequently, computer information services may have fewer opportunities to offer unique information and services because third party providers want to make their products and services available to computer users directly, through several computer information services, or through the Internet. As information services offer increasingly overlapping information and services, subscribers may experience difficulties discerning the differences between them.

In addition to noticing similarities regarding information content and types of services, today's computer information service subscribers may notice similarities in the user interfaces (or means by which subscribers communicate or interact with the information service.) Online information services today generally take advantage of graphical user interface technology in designing and implementing a user interface that allows subscribers to access the service. In general, graphical user interfaces allow computer users to perform tasks using windows that serve as workspace within a program.

The computer screen on which windows appear and disappear is often referred to as a "desktop." Windows that appear on the desktop are typically rectangular work areas containing a number of components or screen objects with which a user may interact. The components or screen objects are pictorial representations of recognizable items and are often referred to generally as icons. For example, a window may contain icons that look like buttons the user may "push." Typically, a screen cursor or pointer, usually displayed as a small arrow, allows the computer user to point at and select individual items appearing on the screen. The screen cursor or pointer moves around the screen in response to a pointing device (e.g., a mouse, trackball, finger) operated by the user. So that a user may select or "click on" an item appearing on the screen, pointing devices usually include a switch (e.g., a mouse button) that the user operates or "clicks" to notify the computer that a choice has been made. Some windows may contain items that must be "double-clicked" with two clicks of the mouse button to be selected. Other items may require the use of either a "right" mouse button or a "left" mouse button to make a selection.

Windows may also contain menus with grouped or categorized commands and options that the user may "select." Menu items are typically displayed in a menu bar that appears at the top of a window or workspace. When a menu is selected, typically, another menu called a "pull-down" menu appears. The second or submenu may include a number of additional items such as a specific action or another menu.

A graphical user interface enables a subscriber to interact with a computer information service by operating a computer mouse or trackball to select pictorial representations of information items or tasks. For example, a subscriber may select a "Shopping" button to enter an online shopping mall or a "Home/Leisure" button to locate information about a favorite hobby. Alternatively, a subscriber may select a menu item or series of items to accomplish a specific task. For example, a subscriber may select the menu item "Read mail" in order to read any new email messages. In general, combinations of buttons and menu items are presented to subscribers to assist them in "navigating" to a particular area or destination. Subscribers navigate to an area of the information service in which they may accomplish a specific goal such as locating needed information or performing a desired task.

Although the advent of the graphical user interface has made computers easier to use, subscribers often experience difficulties navigating computer information services because the user interface for communicating with the service is not intuitive. Subscribers who do not have specific goals in mind may find casually browsing the service to be difficult. For example, icons with similar visual characteristics may be used to represent broad categories of information (for example, Entertainment and Home/Leisure) or activities (for example, Shopping and Internet.) Even if subscribers find an item they would like to select, they may have trouble making the selection. Subscribers must remember whether they should singleclick, double-click, right-button click, or left-button click to make the selection. The variety of operations for making selections may confuse users more than it helps them.

In some instances, users may be required to select menu items to perform specific tasks or activities (for example, Create Mail.) In fact, many services today use a "menu tree" for organizing information. Each item on a menu may be viewed as a branch to another menu so that conceptually, the system of menus and branches looks like a tree. As information and services are added, the tree becomes more complex. The use of menus to accomplish tasks requires that subscribers know prior to selecting the item where it is located. If subscribers do not know the location of a particular item, they are forced to search through all the menus, possibly at a number of levels, in order to locate the desired item.

Navigating an information service may be difficult even for subscribers who know what they want to do. Subscribers who know what they want to do need to locate the areas where they may accomplish their goals. The areas may be difficult to find because they require subscribers to enter long series of mouse clicks and menu selections. Subscribers may become lost when they make a wrong selection. A large number of clicks and menu selections may be necessary even if subscribers make correct choices along the way. Furthermore, in windowed environments, multiple selections often result in layered windows on subscribers' desktops making it even more confusing for them to determine whether they are in a location in which a specific task may be accomplished.

The lack of consistency and uniformity in the use of visually similar icons as well as in the use of menu items for some actions may leave subscribers confused, albeit unconsciously. Subscribers may be required to use a lengthy combination of button and menu selections in order to perform a particular task. Furthermore, different combinations of selections may be required to accomplish goals that, from the perspective of subscribers, are similar. Consequently, for many subscribers, the complexity in navigating computer information services derives not from the vastness of available information and services, but from the complexity of the environment in which tasks are completed.

Subscribers to computer information services today have a need for an improved method of navigation. The present invention overcomes the problems and disadvantages of current navigational methods by introducing consistency and uniformity in the computer information service user interface. The navigational method of the present invention is based on a model of computer/user interaction in which users are graphically prompted for a topic of interest, a subtopic of interest, and an associated action. Subscribers may make their selections in one of several orders. Once the three selections have been made, the information system assists subscribers by presenting customized content areas in which their specific goals may be accomplished. The advantages of the present invention will be apparent from the following detailed description and accompanying claims.

DETAIL DESCRIPTION OF PREFERRED EMBODIMENT(S)

The present invention, CompuServe's Easy Navigator User Interface (hereinafter referred to as Easy Navigator), provides a method of navigation that allows subscribers to a computer information service to communicate their needs quickly and efficiently so the information service may assist them in accomplishing their goals. Using the present invention, subscribers are, preferably, never more than three (3) selections—based on a topic, subtopic, and action—away from a customized content area in which their specific goals may be accomplished. Preferably, the three selections may be made in one of several ways. With the exception of being tailored according to subscribers' first three selections, all customized content areas have similar appearances and behavioral characteristics. Once at the customized content area, subscribers may need to perform additional tasks or provide additional information, but, preferably, the paths subscribers may take to reach the customized content area are the same for all combinations of topic, subtopic, and action. Furthermore, depending on the task, subscribers may, after only one or two selections, reach areas in which their goals may be accomplished.

Preferably, all controls in the Easy Navigator user interface are push buttons. Some buttons are graphic-filled objects and some are simple round, rounded square, or rectangular buttons labeled with text. Navigation using Easy Navigator is accomplished, preferably, using single clicks of a mouse button. Furthermore, right button, left button, and multiple clicks may all be used to make a single selection so subscribers are never left wondering whether a single click, a double click, a right button click, or a left button click is needed.

Figure 1:
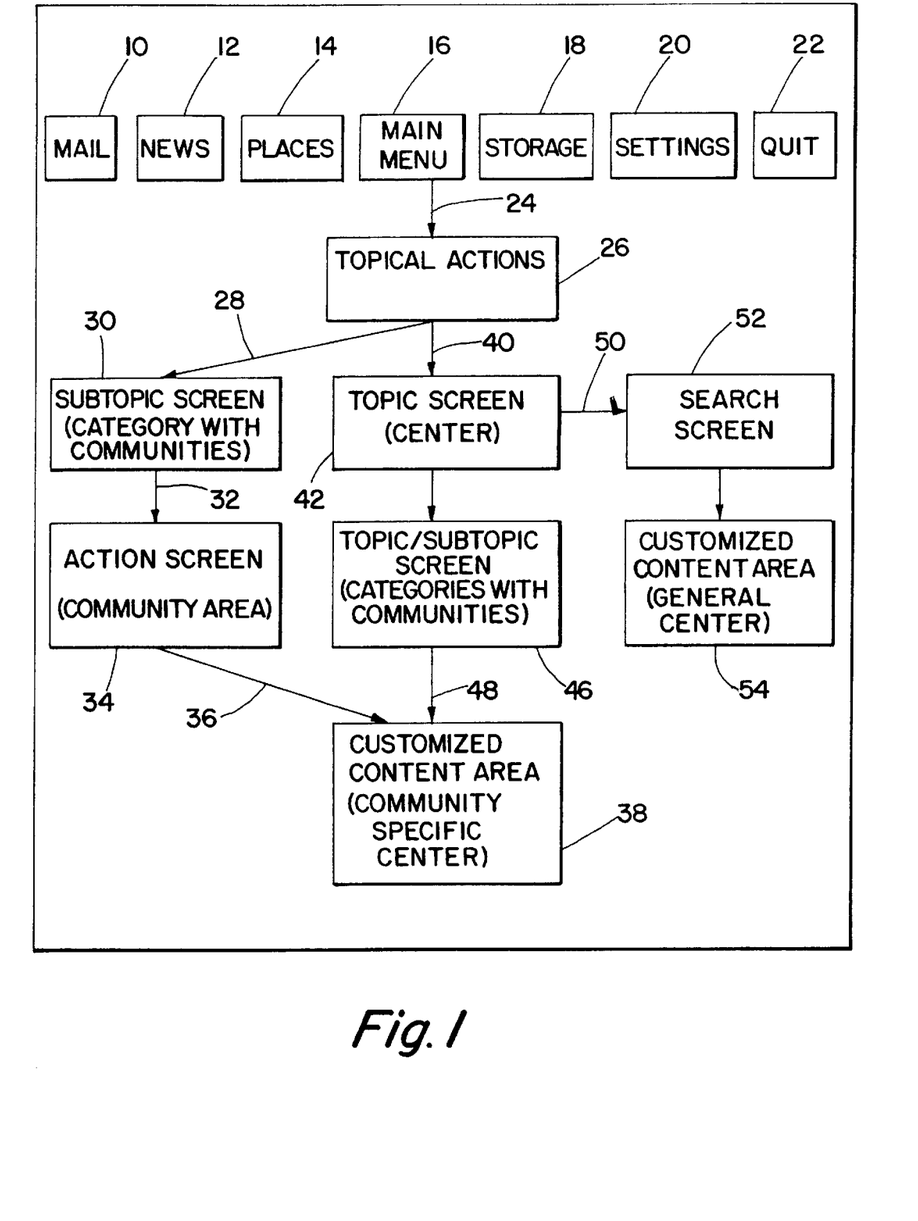
FIG. 1 is a flow diagram of the navigational paths subscribers may take to reach a customized content area.

FIG. 1 is a top-level flow diagram illustrating the navigational concepts of Easy Navigator. As shown in FIG. 1, subscribers using Easy Navigator to navigate an information service, preferably, start at the Easy Navigator Home screen. The Home screen welcomes subscribers at startup. It also functions as a departure point and "home base" for navigating the information service. The Home screen provides immediate access to the major functional areas. From the Home screen, subscribers may:

access mail to read personal communications (Mail) 10;

access the news center to read news stories related to specified topics (News) 12;

traverse to bookmarked locations (Places) 14;

access the main menu to locate a customized content area (Main Menu) 16;

access a filing cabinet containing stored information (Storage) 18;

access modem and session settings (Settings) 20; or exit Easy Navigator and return to the desktop (Quit) 22.

Figure 2:
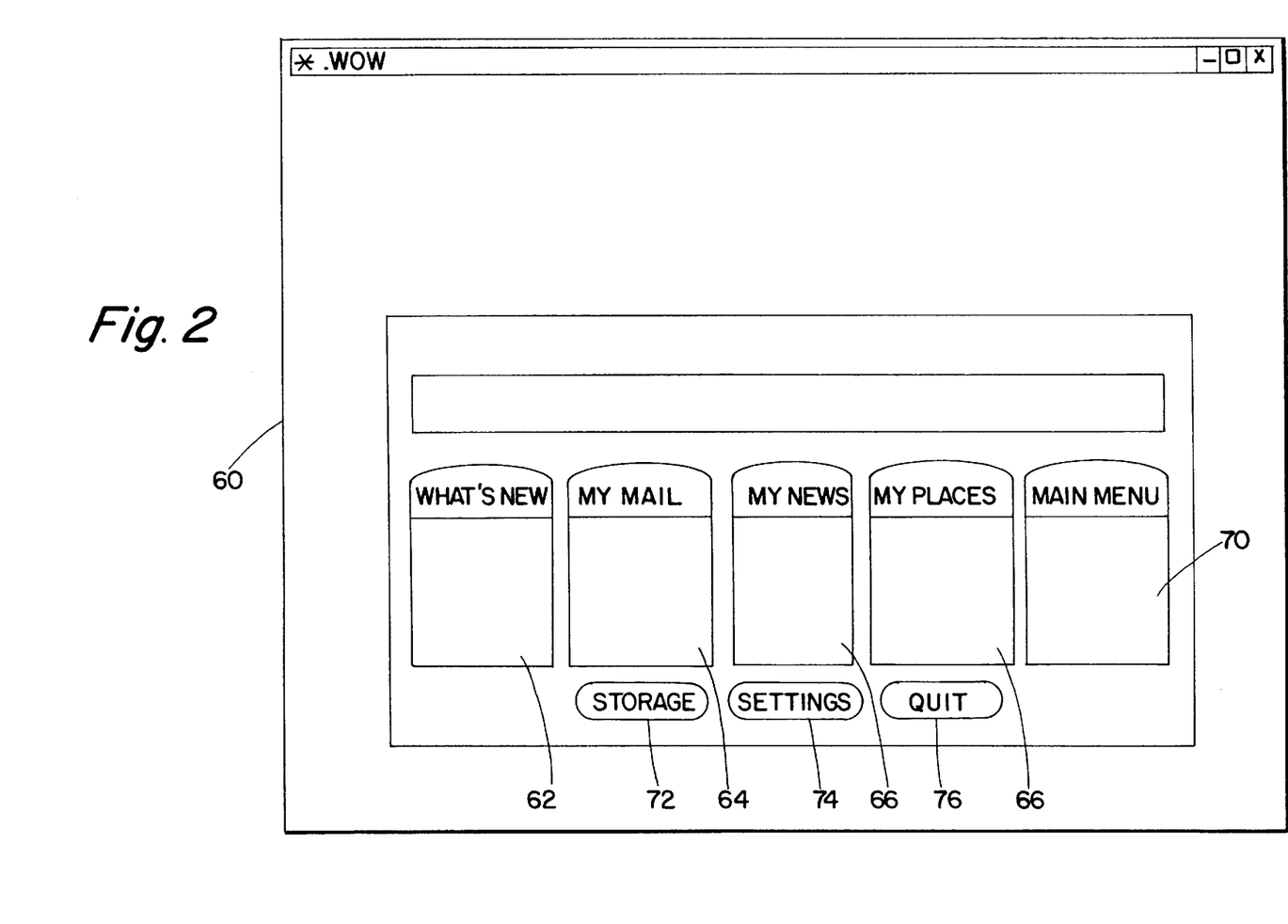
FIG. 2 is a screen shot of a preferred embodiment for a Home screen in accordance with the present invention.

Referring now to FIG. 2, a representation of a preferred embodiment for the Easy Navigator Home screen is shown 60. The Home screen 60 presents options for the tasks that subscribers are most likely to want to perform as described in FIG. 1—learning about new features of the service (What's News) 62, reading email (My Mail) 64, reading news (My News) 66, traversing to bookmarked locations (My Places) 68, or traversing to the topics/actions screen (Easy Navigator Main Menu) 70 to locate a customized content area. In addition, subscribers are given options to access a filing cabinet (Storage) 72, to access modem/user session settings (Settings) 74, or to exit Easy Navigator to return to the desktop (Quit) 76. Preferably, on all subsequent screens, subscribers are given the option of returning to this Home screen by selecting a "Home" button.

Navigation to a customized content area of the information service begins with selection of the Main Menu option 70 of the Easy Navigator Home screen. Referring again to FIG. 1, selection of the Main Menu option 24, preferably, results in the display of a screen comprised of topics and actions (Easy Navigator Main Menu) 26. At the topics/actions screen (Easy Navigator Main Menu) 26, subscribers have the option of selecting a topic 28 or an action 40—the first choice in the series of three or fewer choices needed to navigate to a customized content area.

Figure 3:
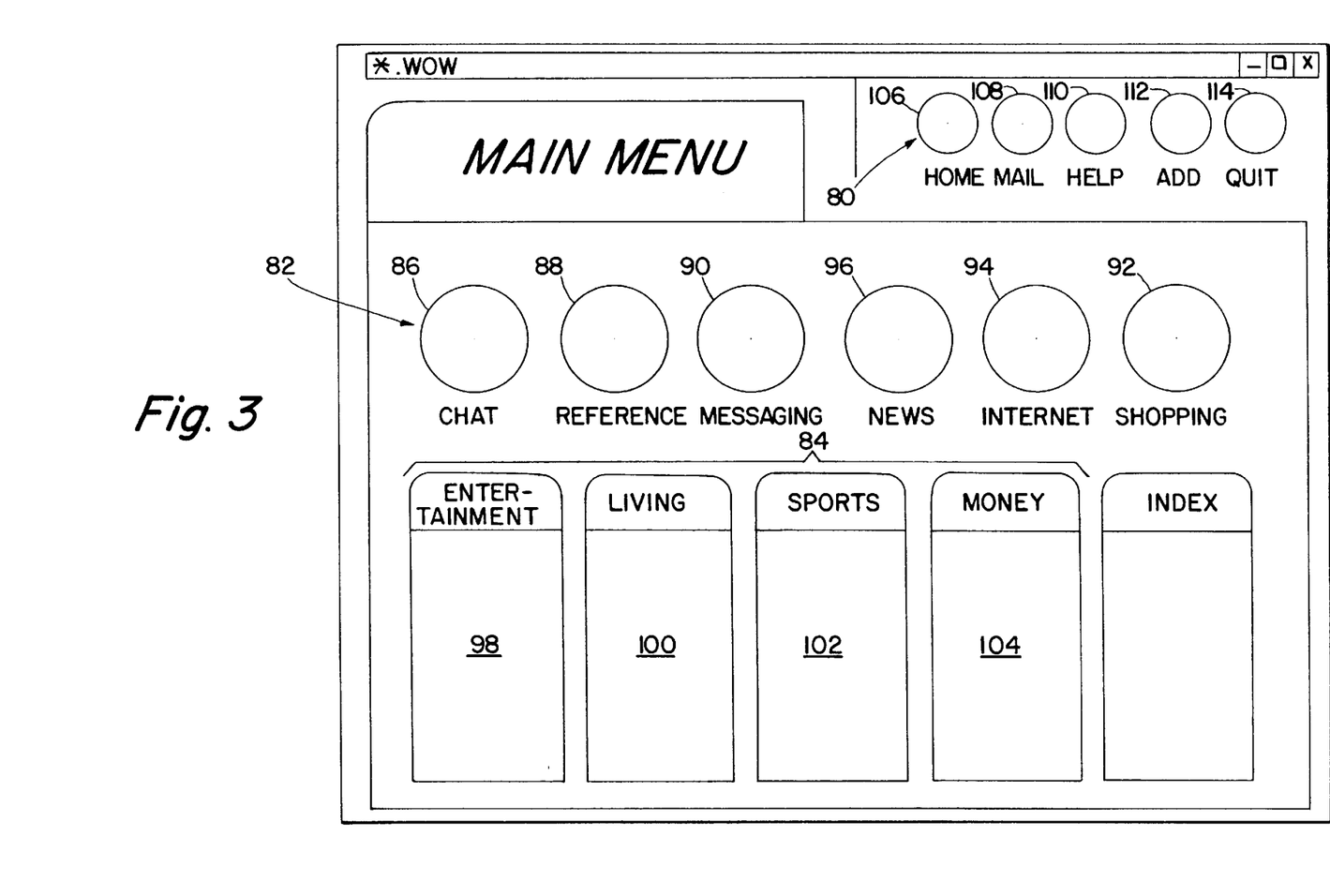
FIG. 3 is a screen shot of a preferred embodiment for a topics/actions screen in accordance with the present invention.

Referring now to FIG. 3, a preferred embodiment of the Easy Navigator Main Menu (topics/actions screen) is shown. Subscribers may choose one of the four (4) topics as represented by the Category Cards 84 Entertainment 98, Living 100, Sports 102, Money 104 or one of six (6) actions as represented by the Tokens 82 Chat 86, Reference 88, Messaging 90, News 96, Internet 94, or Shopping 92. As shown in FIG. 3, topic options (Category Cards) 84 are clearly identifiable and are given display characteristics that distinguish them from the action options (Tokens) 82. Action options (Tokens) 82 are represented as round buttons at the bottom of the Main Menu screen while topics (Category Cards) 84 are large rectangular areas. In addition, actions (Tokens) 82 appear in one row while topics (Category Cards) 84 are organized in a separate row. Finally, each action option (Token) 82 is assigned a distinctive color. The visual cues used in Easy Navigator screens help subscribers to quickly differentiate between topics and actions so that they are more likely to make meaningful choices that lead them to the desired customized content areas. Preferably, the topics/action screen (Easy Navigator Main Menu) has a System Toolbar 80 for performing specific tasks.

Referring again to FIG. 1, if subscribers first choose a topic (Category Card) 28 from the topics/actions screen (Easy Navigator Main Menu) 26, they traverse to the subtopic screen (Easy Navigator Category with Communities) 30. The subtopic screen 30 is comprised of additional topics relating to the selected topic (Category Card) 28. Preferably, the number of subtopics from which subscribers may choose is ten (10) or fewer.

Figure 4:
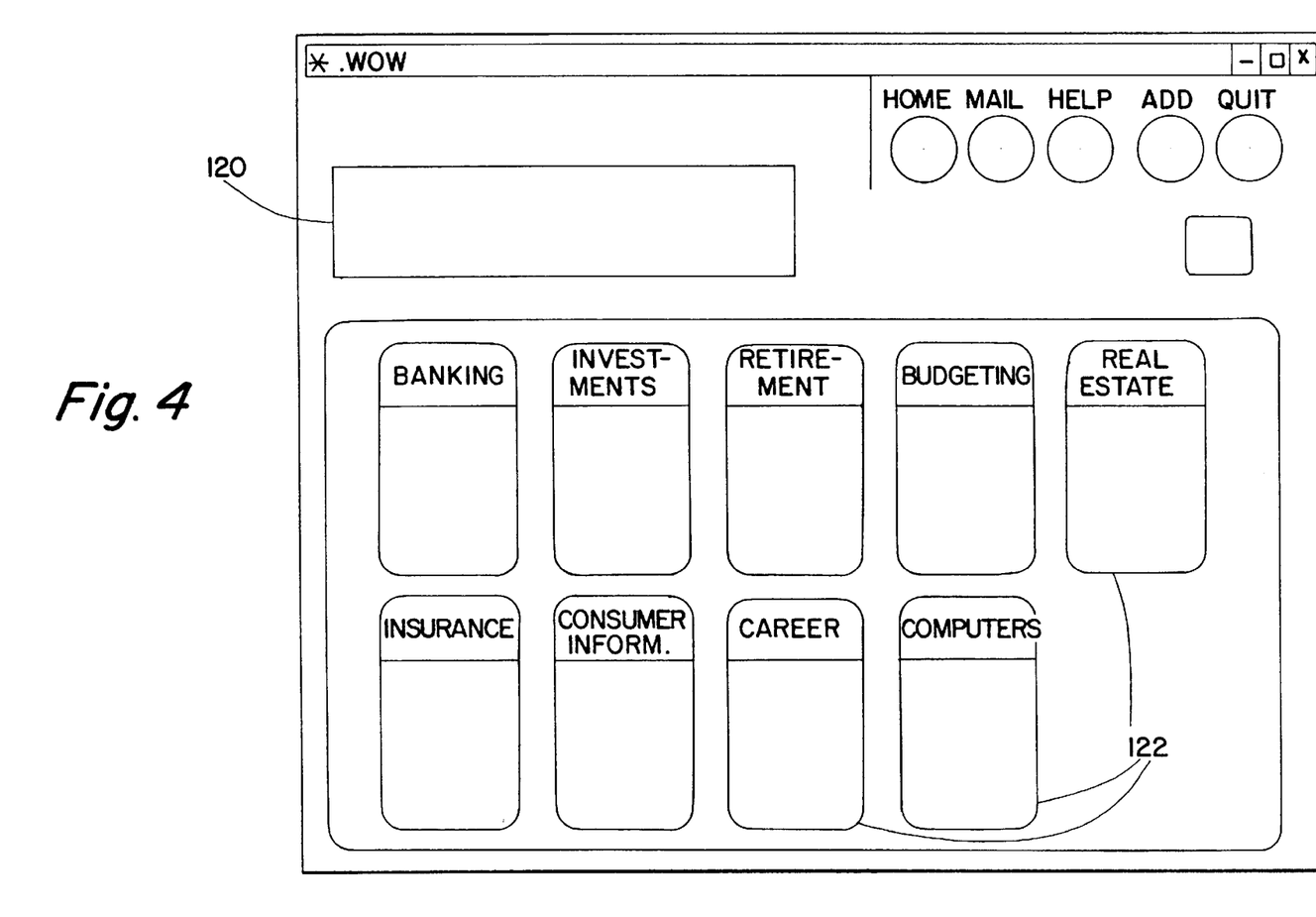
FIG. 4 is a screen shot of a preferred embodiment for a subtopic screen in accordance with the present invention.

Referring now to FIG. 4, a preferred embodiment of a subtopic screen (Category with Communities) 120 for the topic (Category Card) "money" is shown. Representative subtopics (Communities) for the money topic (Category Card) include "real estate" and "computers" 122. Following selection of a subtopic (Community within a Category), only selection of an action is needed to traverse to a customized content area.

Referring again to FIG. 1, after choosing a subtopic (Community within a Category) 32 (second choice), subscribers preferably traverse to an action screen (Easy Navigator Community Area) 34 that contains the six actions from the topics/actions screen (Easy Navigator Main Menu) 26. Because at this point, subscribers have specified a topic (first choice) 28 and a subtopic (second choice) 32, only an action (third choice) 36 is needed to traverse to a customized content area (Easy Navigator Community Specific Center) 38 in which topic/subtopic related tasks may be completed.

For example, if the subscriber has selected "money" as a topic, "budgeting" as a subtopic, and the selected action is "chat," the subscriber may enter a chat content area related to money/budgeting. Once at the chat area, the subscriber may join a chat session and begin monitoring the remarks and comments of other subscribers as well as submit messages to be displayed to the other subscribers participating in the chat session. If the selected action is "shopping," the subscriber may enter an electronic mall area in which products and services related to money/budgeting are presented. The subscriber may browse the offerings in the mall and make online purchases if desired. Other actions available to the subscriber in the specific content area may allow the subscriber to perform other sets of tasks in which the information presented to and/or exchanged with other subscribers, merchants, etc. relates to the selected topic and subtopic.

Figure 5:
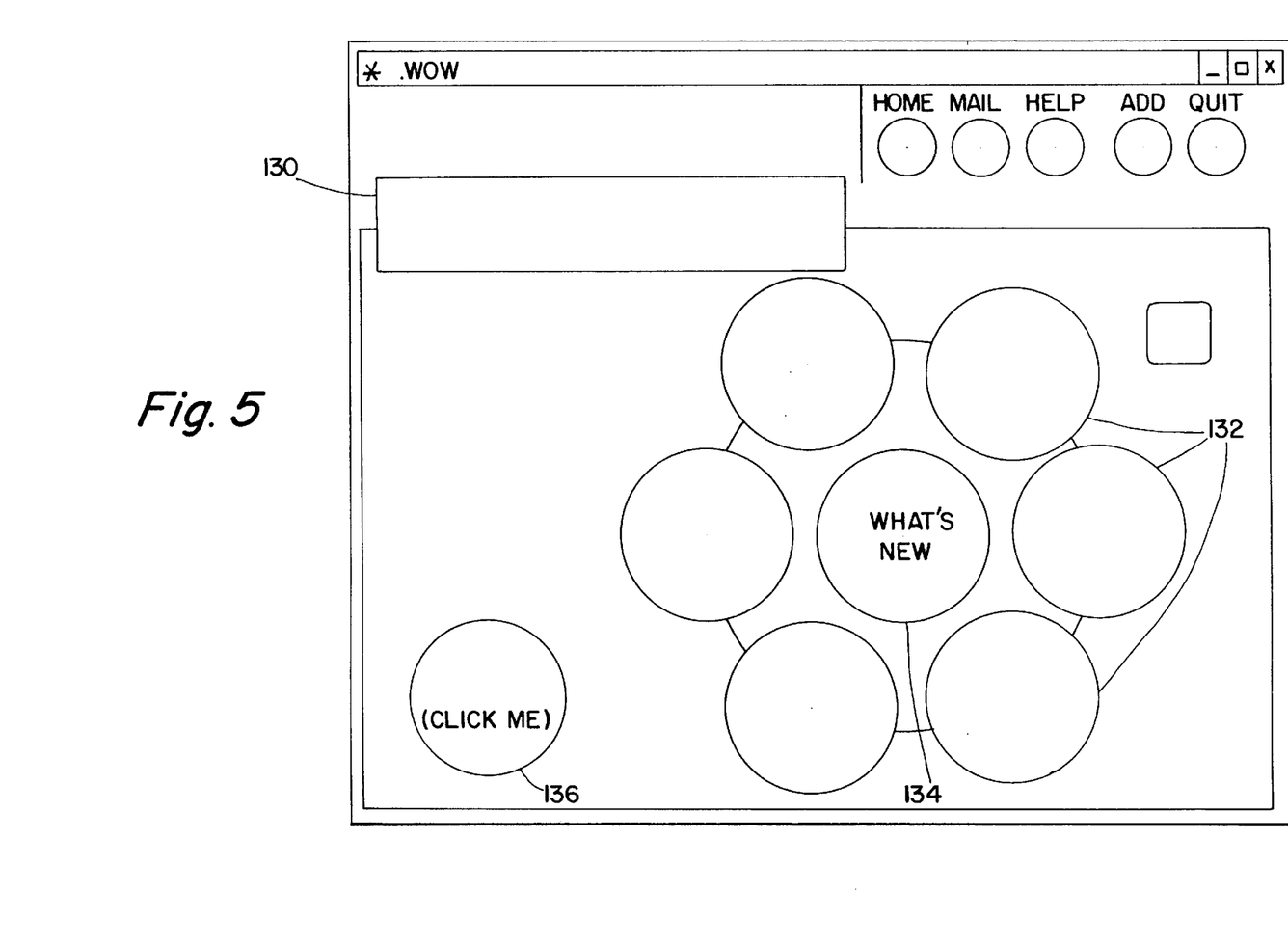
FIG. 5 is a screen shot of a preferred embodiment for an action screen in accordance with the present invention.

Referring now to FIG. 5, a preferred embodiment of an action screen (Easy Navigator Community Area) 34 for a particular topic (money) and subtopic (budgeting) 130 combination is shown. From this screen, subscribers may select one of a number of actions (Tokens-Chat, Reference, Messaging, News, Internet, or Shopping) 132 relating to the topic (Category Card) and subtopic (Community within a Category.) Choice of an action 132 from the action screen (Easy Navigator Community Area) 130 takes subscribers to a customized content area (Easy Navigator Community Specific Center) in which specific tasks may be accomplished. The customized content area may be viewed as a "Community Specific Center" because the tasks that may be performed relate to the specified topic (Category Card), subtopic (Community within a Category), and action. In addition to the six action options (Tokens) 132, subscribers may also read news relating to the community 134 or read a welcome message 136.

Referring again to FIG. 1, subscribers may take another path to reach a customized content area from the topics/actions screen (Easy Navigator Main Menu) 26. Following selection of an action 40, subscribers traverse to a topic screen (Easy Navigator Center) 42. At the topic screen (Easy Navigator Center) 42, subscribers have the option of traversing 44 to a topic/subtopic screen (Easy Navigator Categories with Communities) 46 in order to specify a topic/subtopic pair (Category/Community combination) 48 or traversing 50 to an area in which a search may be performed 52 to find information of interest 54. The ability to search is, in effect, another method for specifying a topic.

Figure 6:
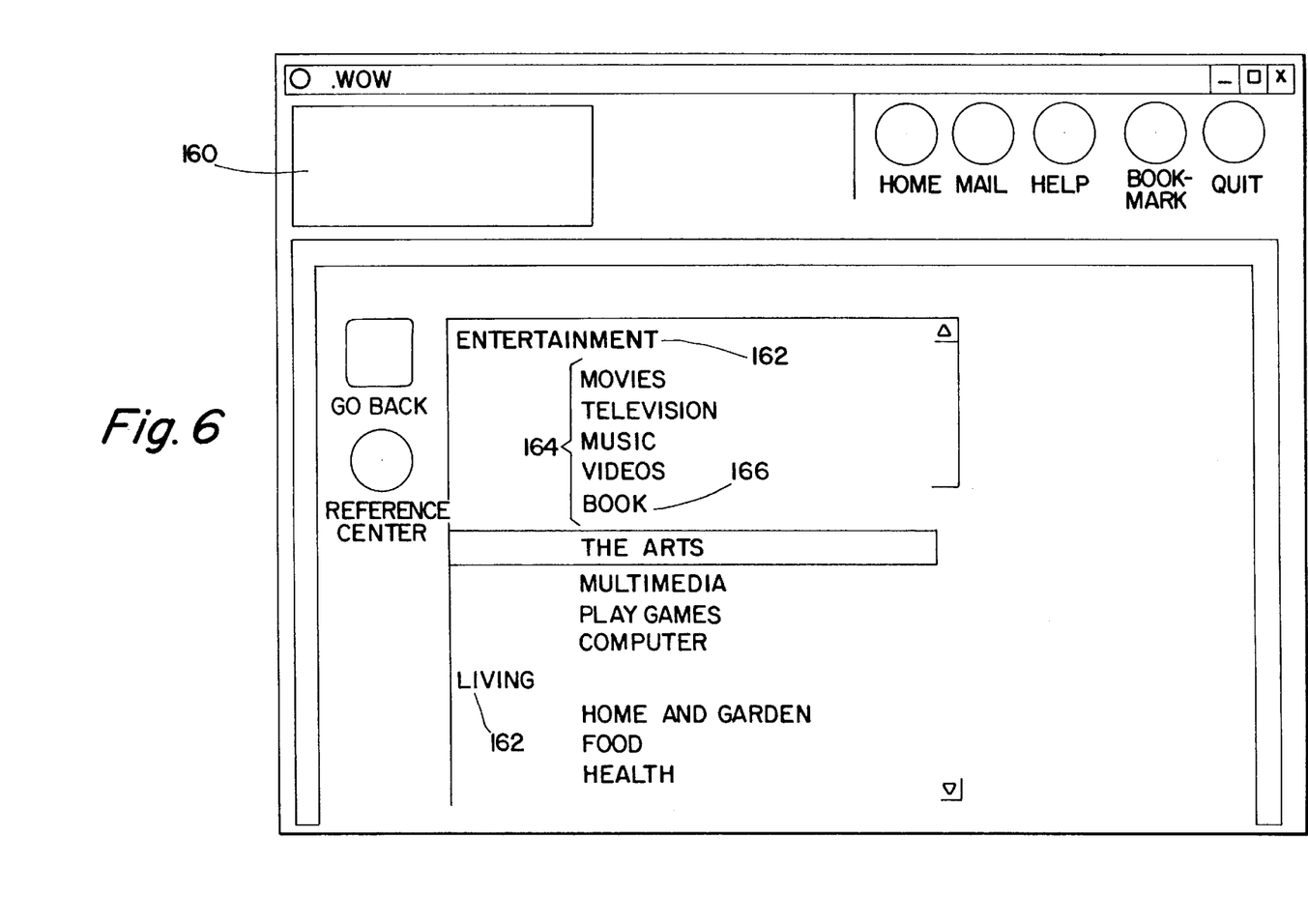
FIG. 6 is a screen shot of a preferred embodiment for a topic screen in accordance with the present invention.
Figure 7:
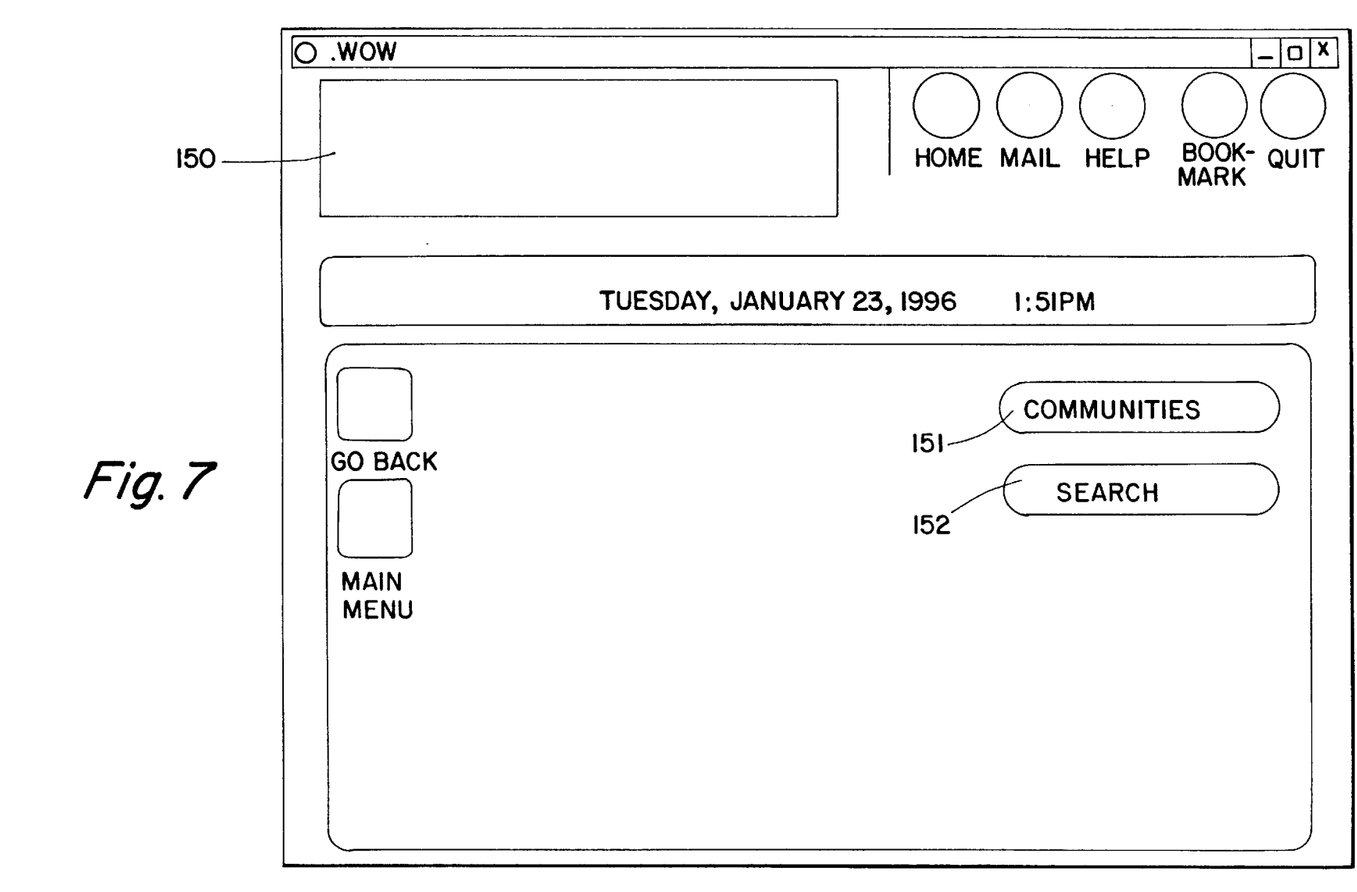
FIG. 7 is a screen shot of a preferred embodiment for a topic/subtopic screen in accordance with the present invention.

Referring to FIG. 6, a preferred embodiment of a topic screen (Easy Navigator Center) 150 is shown. Once at a topic screen, preferably, subscribers may traverse, by selecting the "Categories" button 154, to a topic/subtopic screen (Easy Navigator Categories with Communities) to select a topic/subtopic pair (Category/Community combination). Alternatively, they may traverse, by selecting the "Search" button 156, to an area in which a search may be performed to further locate an area relating to the specified action and search criteria. The customized content area to which subscribers traverse following a search is referred to as an Easy Navigator General Center. FIG. 7 is a preferred embodiment of a topic/subtopic screen (Easy Navigator Categories with Communities) 160 displayed when subscribers specify the "Categories" option on a topic screen (Easy Navigator Center). As shown in FIG. 7, subtopics 164, preferably, are arranged under topics 162 so that a single selection results in the specification of a topic/subtopic pair. For example, selection of the subtopic "Books" 166 results in the specification of the Entertainment (topic)/Books (subtopic) pair.

Referring again to FIG. 1, as may be apparent, subscribers may take one of several paths to reach a customized content area 38. Subscribers may provide a topic 28, subtopic 32, and action 36 or they may provide an action 40 and topic/subtopic pair 48 to reach an Easy Navigator Community Specific Center 38. In addition, subscribers may perform a search 52 within the context of a selected action 40 in order to traverse to an Easy Navigator General Center 54 meeting the specified criteria. Using the search method, subscribers navigate to a customized content area 54 with fewer than three selections. Although subscribers have more than one option for traversing to a customized content area 38, 54, preferably, the available paths are not so numerous that subscribers become confused as they traverse to a customized content area.

Another feature of every Easy Navigator screen (except the Home screen) is the System Toolbar. The System Toolbar provides a core set of options related to basic tasks. These tasks may be performed at any time, regardless of subscribers' locations. Referring again to FIG. 3, the options for the System Toolbar 80 include: return to the Home screen (Home) 106, access the mail center (Mail) 108, access online help (Help) 110, add the present site to the places list (Add or Bookmark) 112, and quit Easy Navigator (Quit) 114. The System Toolbar allows subscribers to feel safe exploring the information system because they know they may return to the Home screen, get help, or quit Easy Navigator at any time. In addition to the convenience it provides to subscribers, the System Toolbar 80 reduces the likelihood that subscribers will become "lost" when navigating the information service because subscribers may return to the home base at any time.

As subscribers navigate the information service, Easy Navigator maintains appearance and behavior distinctions between topic, subtopic, and action screens. At the same time, Easy Navigator gives objects (buttons) that subscribers expect to appear and behave similarly the same set of familiar features so that subscribers can recognize them easily. For example, tokens may be color-coded so that subscribers recognize quickly what actions may be performed at a particular location based on the colors of the buttons. In one embodiment, subscribers may learn quickly that the "Reference" token is always orange. Screens appear one at a time to reduce the confusion that may result when subscribers are presented with multiple, layered windows. The simplicity and consistency in screens and methods of interaction allows subscribers to navigate the information service easily and quickly.

Figure 8:
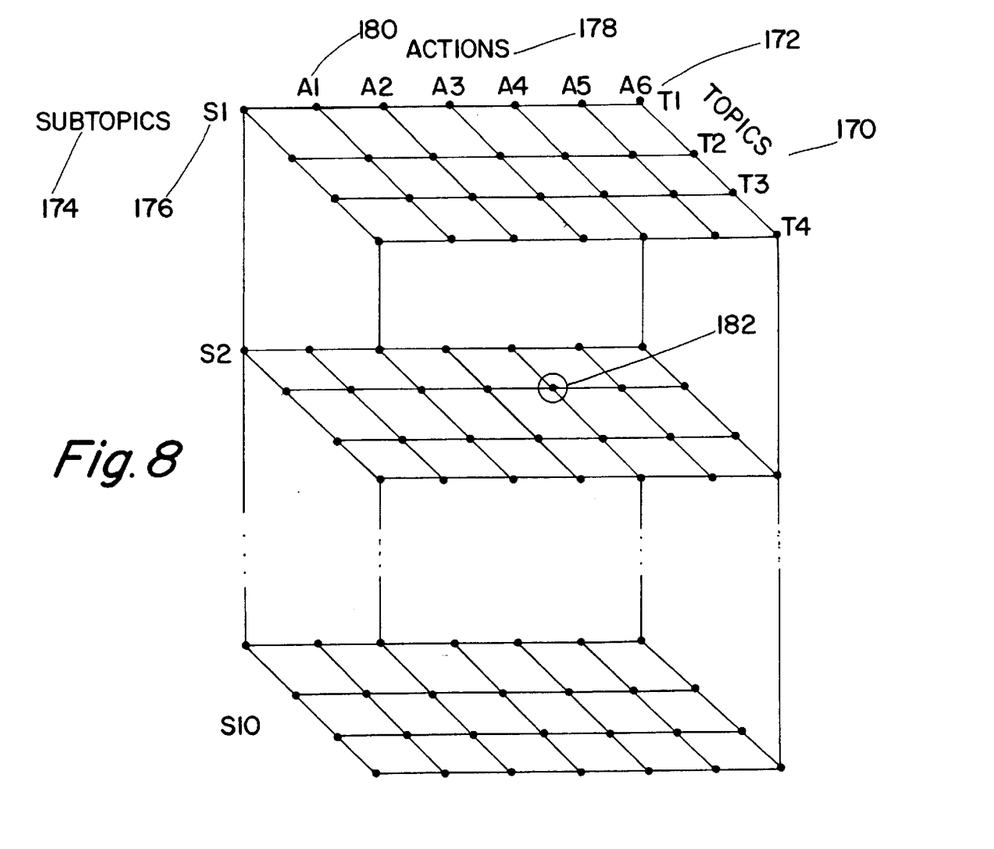
FIG. 8 is a diagram illustrating the concept of the topic/subtopic/action paradigm of the present invention.

In the preferred embodiment in which subscribers are given four topics, ten subtopics, and six actions from which to choose, subscribers are able to reach one of 240 customized content areas in three selections. Conceptually, the combination of topics, subtopics, and actions may be viewed as a three dimensional grid as shown in FIG. 8. The topics (170) may be represented by the rows T1, T2, T3, and T4 (172). The subtopics (174) may be represented by the levels, S1, S2, . . . S10 (176). Finally, the actions 178 may be represented by the columns A1, A2, A3, A4, A5, and A6 (180). Each point in the grid thus represents the intersection of a topic, a subtopic, and an action—in other words, a customized content area. For example, if topic T2 is "Money," subtopic S2 is "Budgeting," and action A4 is "Chat," then the intersection of the selections—T2, S2, A4 (182)—represents the customized content area relating to chat sessions about budgeting. Although the grid is transparent to subscribers, navigation through the information service actually involves movement between points on the grid where each point represents the intersection of a topic, a subtopic, and an action. The various combinations of topic, subtopic, and action may be viewed as the paths that subscribers traverse to reach customized content areas. The grid allows subscribers to maintain a context for what they are doing even though they never know a grid is in place.

The ability to traverse in three selections to a customized content area in which topic related tasks may be performed is unique to the present invention. Although the 240 areas may vary significantly from one another in relation to content, the paths that subscribers traverse to reach the content areas are very similar. Subsequent options presented to subscribers are based on previous selections so that subscribers are given visible and clear indications of what can and cannot be done at any given time. The tailoring of options based on previous selections also reduces the likelihood of subscriber errors in navigating the information service. Finally, the customized content areas have similar display and behavioral characteristics (e.g., sizing, positioning, color-coding of buttons) so that subscribers may perform similar types of tasks within each customized content area. Consequently, Easy Navigator is appropriate for subscribers who know exactly what they want to do and subscribers who have no idea what they want to do. Easy Navigator quickly determines what subscribers—whether experienced or novice—want to do and the information service responds by locating a content area in which subscribers may complete the desired tasks.

Figure 9:
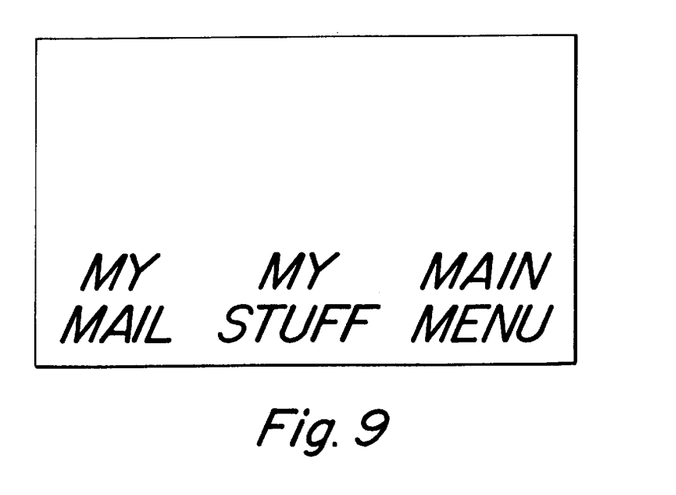
FIG. 9 is a screen shot of a preferred embodiment for an Easy Navigator screen tailored to children.

Novice subscribers who benefit from the approach of Easy Navigator may include children. As shown in FIG. 9, Easy Navigator screens may be tailored to children. The conceptual model employed to develop screens for adults—the grid—may also be used to develop screens for children. Using Easy Navigator, only three selections are needed to traverse to a customized content area so that both children and adults are able to navigate an information system easily and effectively.

Figure 10:
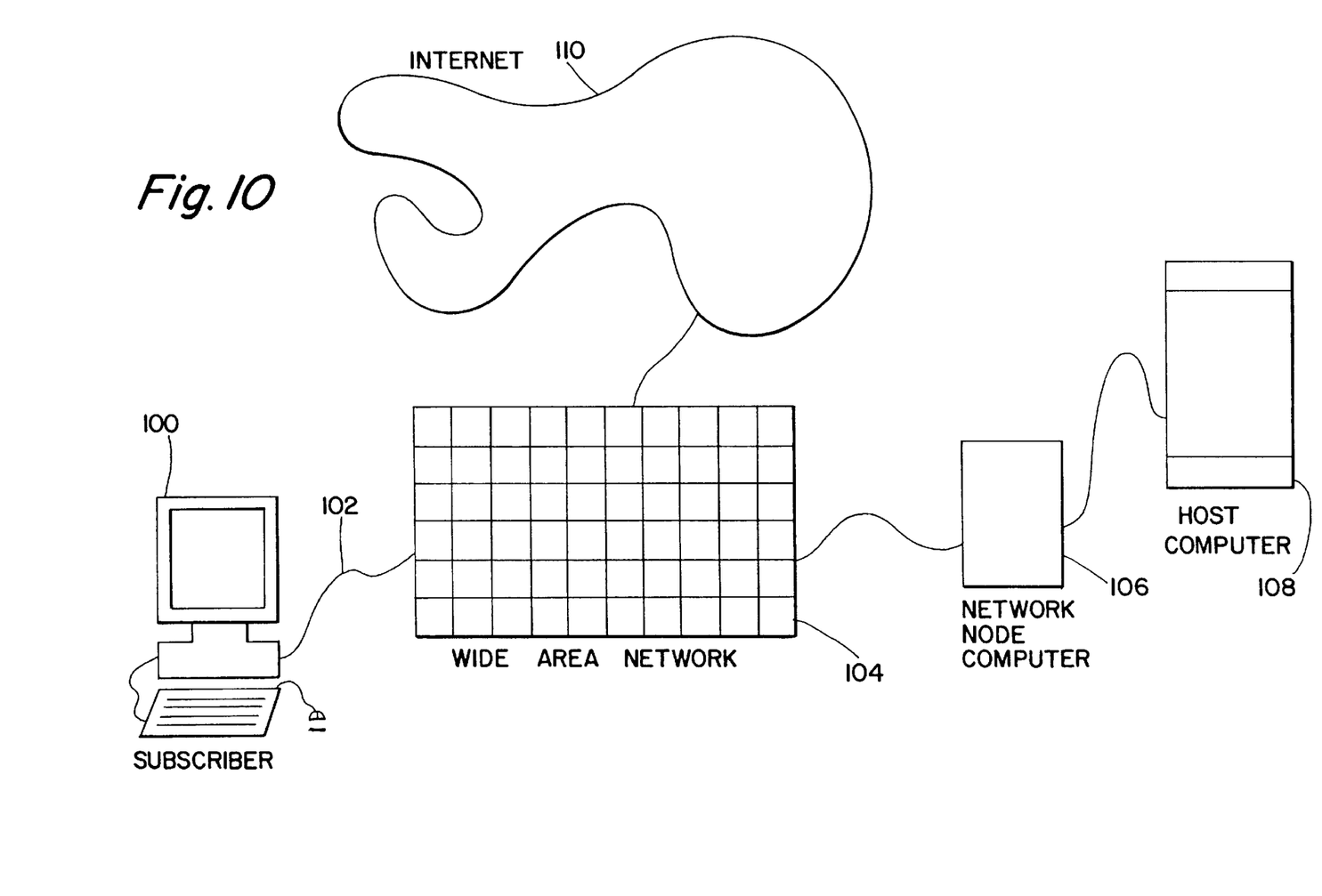
FIG. 10 is a block diagram of a computer system in which the present invention is embodied.

FIG. 10 is a computer system block diagram that illustrates use of the present invention to communicate with an information service. The information service may be viewed as a wide area network 104—with a communication link to the Internet 110—consisting of node computers 106 that manage network traffic and host computers 108 with which subscribers connect in order to take advantage of the services offered. Preferably, the present invention is embodied in an application program running on a subscriber's computer 100. The subscriber's computer 100 establishes a connection 102 to a host computer 108 through a network node computer 106 using, for example, a modem or a cable. The network node 106 routes communications between the subscriber's computer and the information service host computer that provides the needed functionality. Host computers assist subscribers in completing tasks such as retrieving information and sending messages to other subscribers.

Preferably, communications between the subscriber's computer and the host computer are based on application-level protocols. Application-specific protocols carry out data transactions between the subscriber's computer and a host computer. Information between the subscriber's computer and host computer is exchanged in binary transaction packets known as protocol data unit packets. The packets describe, in a succinct and structured format, both data and information about how it may be used by the application. Based on the subscriber's responses when using Easy Navigator, the subscriber's computer creates request packets formatted according to the requirements of the protocol and transmits them to the host computer. The host computer then transmits structured return packets that Easy Navigator understands. The primary benefit of using a transaction-oriented application-level protocol to communicate with the information service is that the user interface embodied in the application program on the subscriber's computer may change and evolve with minimal impact on the host computer application. Many communication protocols such as those currently in use on the Internet may work as well to accomplish the objectives of the present invention.

The present invention has been described in detail with reference to a single, preferred embodiment. Different numbers of topics, subtopics, and actions may be used in an alternative embodiment and still fall within the scope of the present invention. In addition, different categories for topics and subtopics as well as different actions may be used and still fall within the scope of the present invention. Finally, topics, subtopics, and actions may be merged in a presentation so that subscribers are required to make only a single selection to reach customized content areas.

The challenge of continued expansion and growth for computer information services rests in the ability of subscribers to accomplish specific goals such as locating needed information and performing desired tasks. As computer information services evolve, the value of information and related services depends increasingly on the quality of the subscriber interaction with the service as well as the ability of the service to deliver utility to subscribers. Subscribers need the ability to locate and retrieve easily items that are of value and use to them. The present invention improves the quality of subscriber interaction by providing a method of navigation that allows subscribers to quickly communicate their needs so the information service may assist them accomplishing their goals.

What is claimed is:

1. A method for a subscriber to navigate a computer information service adapted to offer at least information retrieval, electronic mail, and chat services, comprising the steps of:
    providing a computer application program for prompting said subscriber and determining said subscriber's responses;
    prompting said subscriber to select one of a plurality of topics;
    determining said subscriber's response to said topic prompt;
    prompting said subscriber to select one of a plurality of subtopics;
    determining said subscriber's response to said subtopic prompt;
    prompting said subscriber to select one of a plurality of actions;
    determining said subscriber's response to said action prompt; and
    providing said subscriber with access to a content area customized for the combination of said subscriber's responses to said topic prompt, said subtopic prompt, and said action prompt to said computer application program.

2. The method of claim 1, wherein prompting said subscriber of an action occurs before prompting said subscriber for a topic.

3. The method of claim 1, wherein prompting said subscriber for a topic occurs before prompting said subscriber for an action.

4. The method of claim 1, wherein said subscriber is prompted to select a topic and subtopic pair.

5. The method of claim 1, wherein said subscriber is prompted for topic, subtopic, and action responses using icons that represent said topics, said subtopics, and said actions.

6. The method of claim 1, wherein display characteristics of said topic icons or said subtopic icons are distinguishable from said action icons.

7. The method of claim 1, wherein said subscriber may select one of four topics, one of ten subtopics, and one of six actions.

8. The method of claim 1, wherein said subscriber is prompted for additional information based on said subscriber's previous response.

9. The method of claim 5, wherein said icons may be selected using a single operation.

10. The method of claim 1, wherein said subscriber may perform in said content area specific tasks related to said subscriber's responses to said topic prompt, said subtopic prompt, and said action prompt.

11. The method of claim 10, wherein said specific tasks may be selected from the group of reading and composing electronic messages, reading online news, chatting online with subscribers, electronic shopping, and navigating a foreign electronic information service.

12. An online information service navigation system, said online information service adapted to offer at least information retrieval, electronic mail, and chat services, said system comprising:
    a graphical user interface on a subscriber's computer for prompting a subscriber for a topic response, a subtopic response, and an action response;
    a connection between said subscriber's computer and a host computer that is part of said online information service for transmitting and receiving packets;
    at least one request packet for communicating said subscriber's topic response, subtopic response, and action response to said host computer, said request packet assembled and transmitted to said host computer by said subscriber's computer; and
    at least one return packet assembled and transmitted by said host computer for providing said subscriber with access to a content area information customized for the combination of topic response, subtopic response, and actions response in said at least one request packet.

13. The system of claim 12, wherein said topic response, said subtopic response, and said action response are represented by icons.

14. The system of claim 13, wherein said icons may be selected using a single operation.

15. The system of claim 13, wherein said topic and said subtopic icons are distinguishable from said action icons.

16. The system of claim 12, wherein said subscriber may perform additional tasks within said content area.

17. The method of claim 16, wherein said additional tasks may be selected from the group of reading and composing electronic messages, reading online news, chatting online with subscribers, electronic shopping, and navigating a foreign electronic information service.

18. A computer information service navigation system, comprising:
    a plurality of content areas, each of said content areas related to a topic, a subtopic, and an action;
    a selected topic, subtopic, and action;
    a content area based on said selected topic, subtopic, and action; and
    a display for presenting said content area to a computer user.

19. The system of claim 18, wherein one of four topics, one of ten subtopics, and one of six actions may be selected.

20. The system of claim 18, wherein said topic, said subtopic, and said action are represented by icons.

21. The system of claim 20, wherein said icons may be selected using a single operation.

22. The system of claim 18, wherein said content areas have similar appearances and behavioral characteristics.

23. A system for navigating a computer information service adapted to offer at least information retrieval, electronic mail, and chat services, comprising:

a plurality of content areas;

a plurality of paths of equal length for traversing to said content areas;

a plurality of icons for traversing one of said plurality of paths;

means for selecting icons associated with one of said plurality of paths; and a display for presenting one of said plurality of content areas customized for the combination of said icon selections.

24. The system of claim 23, wherein said plurality of content areas have similar appearance and behavioral characteristics.

25. The system of claim 23, wherein said icons represent topics, subtopics, and actions.

26. The system of claim 23, wherein said icons may be selected in one of several orders.

27. The system of claim 23, wherein said paths are of length three or less.

28. A product for enabling users to access content areas on a computer network, at least one content area adapted to offer electronic mail services and at least one content area adapted to offer chat services, said product comprising:

a first entry selection point, including a navigational grid containing a plurality of rows and columns, wherein said rows define a first set of entry options and said columns define a second set of entry options;

means for selecting one of said set of first entry options or one of said set of second entry options on said first entry selection point; and means for selecting one of said set of first entry options if one of said set of second entry options has been previously selected, or for selecting one of said set of second entry options if one of said set of first entry options has been previously selected on said first entry selection point.

29. The product of claim 28, wherein said navigational grid is transparent to said user.

30. The product of claim 28, further comprising a second selection point, said second selection point including a plurality of third options, said third options having a dependent relationship to one of said first or second entry options.

31. The product of claim 28, wherein said first set of entry options and said second set of entry options are presented to said user in a single presentation format.

32. The product of claim 28 in which said users may accomplish additional tasks at said content areas selected from said entry options.

33. The method of claim 32, wherein said specific tasks may be selected from the group of reading and composing electronic messages, reading online news, chatting online with subscribers, electronic shopping, and navigating a foreign electronic information service.

\* \* \* \* \*